United States Patent [19]
Crooks

[11] 3,739,647
[45] June 19, 1973

[54] PLANETARY TRANSMISSION
[75] Inventor: James W. Crooks, Milwaukee, Wis.
[73] Assignee: Allis-Chalmers Corporation, Milwaukee, Wis.
[22] Filed: Oct. 12, 1971
[21] Appl. No.: 188,261

[52] U.S. Cl. ............... 74/15.63, 74/682, 74/705, 74/759
[51] Int. Cl. ... F16h 37/00, F16h 37/06, F16h 57/10
[58] Field of Search ................ 74/682, 674, 705, 74/15.63

[56] References Cited
UNITED STATES PATENTS

| | | |
|---|---|---|
| 2,793,533 | 5/1957 | Swenfon et al. .................. 74/15.63 |
| 2,932,202 | 4/1960 | Rinkema ...................... 74/15.63 X |
| 3,065,643 | 11/1962 | Mark et al. ...................... 74/15.63 |
| 3,430,518 | 3/1969 | Auriol ................................ 74/705 |
| 3,487,723 | 1/1970 | Piot ................................... 74/682 |
| 3,487,724 | 1/1970 | McIntyre et al. ................ 74/15.6 X |

Primary Examiner—Arthur T. McKeon
Attorney—Arthur L. Nelson, Robert B. Benson and Charles L. Schwab

[57] ABSTRACT

A power shift transmission having planetary and countershaft gearsets, and clutch carriers for selectively transmitting power to and from the elements of the gearsets to selectively provide one of a multiplicity of speed ratios through the transmission.

10 Claims, 5 Drawing Figures

| RANGE | CLUTCHES | RATIO |
|---|---|---|
| R | 26-28 | 1.62 |
| 1 | 26-23 | 3.93 |
| 2 | 23-27 | 2.31 |
| 3 | 27-26 | 1.81 |
| 4 | 27-25 | 1.62 |
| 5 | 27-24 | 1.37 |
| 6 | 24-26 | 1.00 |

PLANETARY TRANSMISSION

This invention relates to a planetary transmission and more particularly to a transmission having a countershaft gearset, a front planetary gearset with a front clutch carrier rotating coaxially for selective transfer of power to and from one of the elements of the ring gear, sun gear, or planetary carrier of said front planetary gearset and a dual pinion rear planetary gearset with a rear clutch carrier transferring power from the rear planetary gearset and the countershaft gearset to the output shaft.

Various power transmissions have been employed in vehicles, such as the countershaft transmissions and planetary gear transmissions with mechanical and power shifting. While various types of transmissions have basically certain inherent advantages, the primary function of the transmission is to provide a suitable number of speed ratios for smooth transmission of power through the transmission and smooth transition from one gear ratio to another with maximum efficiency. Accordingly, this invention provides a combination of various types of transmissions which incorporate many of the advantages of each type of transmission.

It is an object of this invention to provide a planetary transmission having a front planetary gearset and a rear dual pinion planetary gearset, and a countershaft gearset, together with rotating clutch carriers on the front and the rear of the transmission rotating concentrically with the planetary gearsets with means for transferring power to and from the elements of the gearsets for transmitting power through the transmission at the selected speed ratio.

It is another object of this invention to provide a planetary transmission having a front planetary gearset and a rear dual pinion planetary gearset and a countershaft gearset with a clutch carrier rotating concentrically with each of the front and the rear planetary gearsets for selectively providing one of a plurality of power paths and speed ratios through the transmission as selected by a control means.

It is a further object of this invention to provide a planetary transmission having a front planetary gearset connected to the input drive shaft and a rear dual pinion planetary gearset and a countershaft gearset with a front clutch carrier rotating coaxially with the front planetary gearset for selectively transferring power from the elements of the front planetary gearset and a rear clutch carrier for selectively connecting the countershaft gearset and the rear dual pinion planetary gearset to transfer power to the output shaft in response to selectively operating the transmission controls.

The objects of this invention are accomplished by providing an input drive shaft and an output driven shaft rotating coaxially within a transmission housing. A front planetary gearset is connected to the input shaft and a rear dual pinion planetary gearset is selectively connected to the output shaft and rotates coaxially therewith. An input clutch carrier and an output clutch carrier also rotate coaxially with the planetary gearsets and each have a gear constantly engaging countershaft gears for transmitting power around the planetary gearsets. The front clutch carrier has friction members individually connected to each one of the ring gear, the sun gear and the planetary carrier to selectively transfer power from the front planetary gearset to the front clutch carrier to selectively transfer power through the countershaft gearset or the front planetary gearset. A rear clutch carrier rotates coaxially with the dual pinion rear planetary gearset and has a friction member on the sun gear and the planetary carrier to selectively transmit power from the countershaft gearset and the rear dual pinion planetary gearset to the output shaft. Control means selectively actuate one or more of the plurality of clutches on the clutch carriers or a brake mounted on the transmission housing to selectively engage clutches or the brake for transmission of power through the transmission for desired speed ratios.

The preferred embodiments of the invention have been illustrated in the attached drawings.

Figure 1:
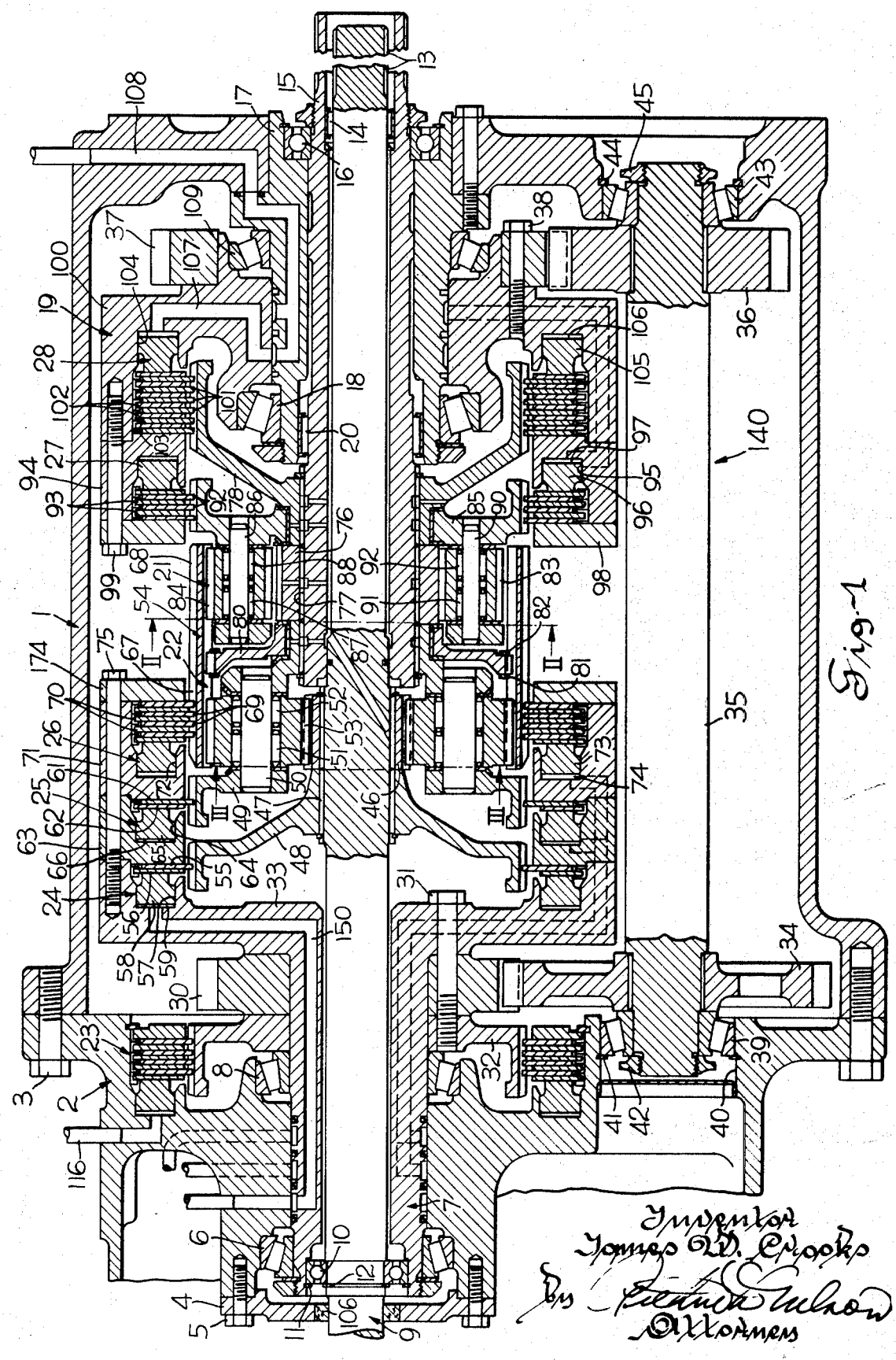
FIG. 1 illustrates a cross section view of the transmission.
Figure 2:
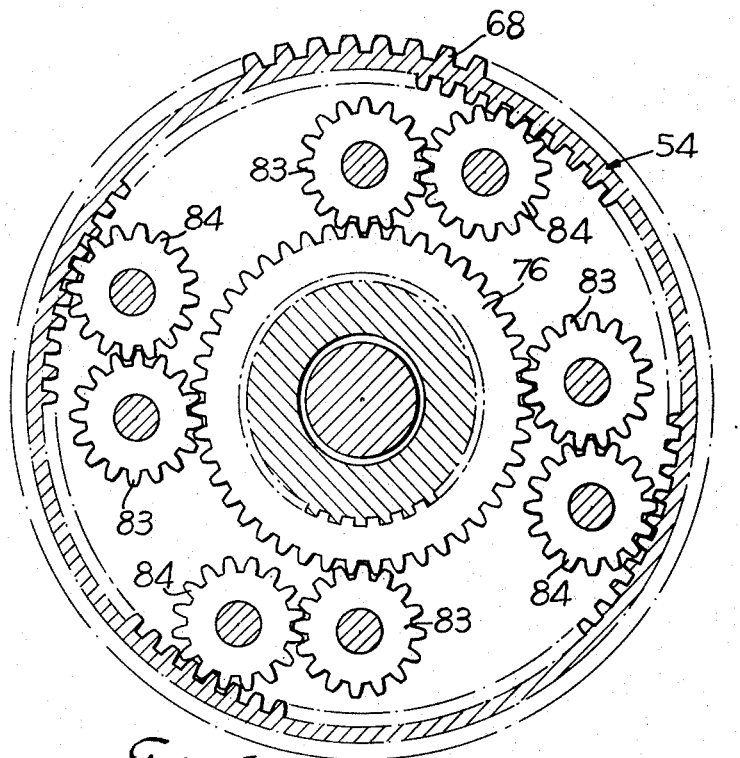
FIG. 2 is a cross section view taken on line II—II of FIG. 1.
Figure 3:
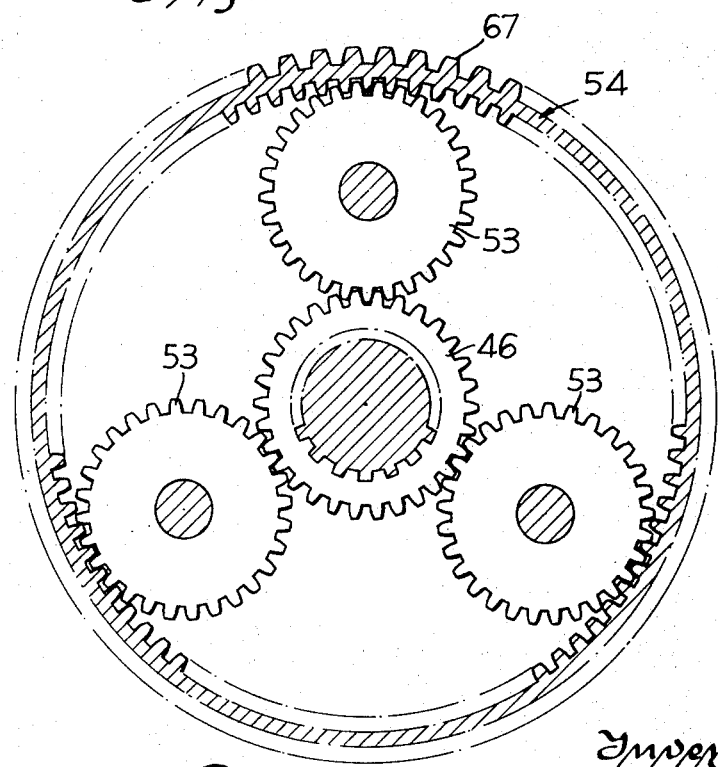
FIG. 3 is a cross section view taken on line III—III of FIG. 1.

Referring to FIG. 1, a transmission housing 1 is bolted to the end plate 2 by a plurality of bolts 3. The end plate 2 provides bearing support for the shafts and supports the cover plate 4 which is fastened by a plurality of bolts 5 carrying a seal 106 sealing the end of the transmission.

The end plate 2 embraces the bearing assembly 6 which rotatably supports the left hand end of the front clutch carrier 7. The end plate 2 also embraces the bearing assembly 8 which rotatably supports the intermediate portion of the front clutch carrier 7.

The left hand end of the input drive shaft 9 is rotatably supported on the bearing assembly 10 which is held in position by the retainer rings 11 and 12 on the inner periphery of the front clutch carrier 7.

The right hand end of the input drive shaft 9 forms a power take-off shaft with a spline 13 on its right hand end. Immediately to the left of the spline 13, the shaft 9 is journaled in the bearing assembly 14 which is rotatably supported within the quill shaft 15. The quill shaft 15 or output driven shaft is rotatably mounted in the bearing assembly 16 which is carried on the bearing support sleeve 17. The bearing support sleeve extends into the transmission and supports the bearing assembly 18 which is embraced by the rear clutch carrier 19. The bearing support sleeve 17 encircles the needle bearing assembly 20 which rotatably supports the quill shaft 15 radially inward from the bearing assembly 18. The output driven shaft or quill shaft 15 supports the rear dual pinion planetary gearset 21. The front planetary gearset 22 is supported on the input drive shaft 9.

The front clutch carrier 7 is braked by the brake 23 mounted internally of the end plate 2 and having a friction disk carried on the front clutch carrier 7.

The clutch 24, clutch 25, and clutch 26 selectively clutch a friction element carried on the sun gear 46, the planetary carrier 49, and the ring gear 67 of the front planetary gearset 22.

The clutch 27 and 28 selectively clutch a friction element carried on the planetary carrier 85 and the sun gear 76 of the rear dual pinion planetary gearset 21.

The front clutch carrier 7 carries the gear 30 which is bolted by a plurality of bolts 31 to the brake hub 32 and the rotor 33. The rotor 33 extends through the end plate 2 and is rotatably supported on the bearing assembly 6. The gear 30 meshes with a gear 34 splined to the countershaft 35. The countershaft 35 is also splined to the gear 36 which meshes with gear 37 on the rear clutch carrier 19. The gear 37 is bolted to the rear clutch carrier 19 by a plurality of bolts 38. The countershaft 35 is rotatably supported on the bearing assembly 39 received within the opening 40 and the end plate 2. The bearing assembly 39 is retained by the snap ring 41 and the bearing nut 42 positioned on the end of the bearing 39 and the countershaft 35.

The right hand end of the countershaft 35 is similarly mounted in a bearing assembly 43 in the transmission housing 1. The bearing assembly 43 is maintained in position by the snap ring 44 and the bearing retainer nut 45.

The front planetary gearset 22 includes a sun gear 46 which is splined to the input shaft 9. The spline 47 also carries the clutch hub 48. The planetary carrier 49 on the input planetary gearset 22 supports the pin 50. The pin 50 is embraced by the bearing assemblies 51 and 52. The planet gears 53 are in constant mesh with the sun gear 46 and the ring gear 67. The ring gear 67 has a gear facing on its inner periphery and together with ring gear 68 for the rear planetary gearset 21 forms the integral gear 54.

The clutch hub 48 is splined on its external periphery to receive a clutch disk 55 which frictionally engages a mating clutch disk 56 which is carried in the rotor 33. The rotor 33 forms a hydraulic cylinder 57 which receives a hydraulic piston 58 which defines the pressurizing chamber 59 in communication with the hydraulic fluid conduit 150. The clutch 24 when actuated frictionally engages the clutch disks 55 and 56 and clutches the sun gear 46 with the clutch carrier 7.

The planetary carrier 49 is splined on its external periphery to receive the clutch disk 61 which frictionally engages the clutch disk 62 received in the annulus 63 which forms a hydraulic cylinder 64. The hydraulic cylinder 64 receives the hydraulic piston 65 which forms the hydraulic pressurizing chamber 66. When the clutch 25 is actuated, the front clutch housing 7 is clutched to the planetary carrier 49.

The ring gear 67 of the front planetary gearset is integral with the ring gear 68 of the rear planetary gearset and is formed by the integral ring gear 54. The integral ring gear 54 forms a gear facing on its external periphery and is embraced by the plurality of clutch disks 69 on its external periphery. The clutch disks 69 frictionally engage mating clutch disks 70 which are seated on the splined portion of the annulus 71. The annulus 71 forms a hydraulic cylinder 72 which receives the hydraulic piston 73 which defines the pressurizing chamber 74. When the clutch 26 is actuated, the clutch disks 69 and 70 frictionally engage each other and the ring gear 67 is clutched to the input clutch carrier 7. It is also noted that the backup plate 174 forms the reaction member for the clutch 26. A plurality of bolts 75 extend through the annulus 71, 63 and the rotor 33 to fasten the assembly to form the front clutch carrier.

The rear planetary gearset 21 is also rotatably mounted coaxially with the shafts 9 and 15. The sun gear 76 of the rear planetary gearset is splined to the quill shaft 15. The splined portion 77 on the quill shaft 15 also receives the carrier 49 of the input planetary gearset 22. A continuation of the spline 77 also receives a mating clutch housing 78. The integral ring gear 54 is supported on the annulus 80 which is retained axially by the snap rings 81 and 82. The sun gear 76 engages the inner planet pinion 83 which is in constant mesh with the outer planet pinion 84. The outer planet pinion 84 engages the ring gear 68. Consequently, the sun gear and ring gear simultaneously rotate in the same direction in contrast to the planetary arrangement of the front planetary gearset in which the ring gear and sun gear are simultaneously rotating in opposite directions.

A planetary carrier 85 carries a plurality of pins 86 which are embraced by bearing assemblies 87 and 88. The bearing assemblies 87 and 88 provide a bearing support for the outer planet pinions 84. The planetary carrier 85 also supports a plurality of pins 90 embraced by a plurality of bearing assemblies 91 and 92 which rotatably support the inner planet pinions 83. It is noted that the inner planet pinions 83 engage the sun gear while the outer planet pinions 84 engage the ring gear 68 of the rear planetary gearset.

A clutch 27 includes a plurality of clutch disks 92 which frictionally engage a plurality of clutch disks 93 carried on the annulus 94. The annulus 94 forms a hydraulic cylinder 95 and a piston 96 which form a pressurizing chamber 97 for actuating the clutch. The reaction plate 98 is bolted by a plurality of bolts 99 which fasten the annulus 94 to rotor 100 to form the assembly comprising the rear clutch carrier 19. The clutch hub 78 supports a plurality of clutch disks 101 interposed between the clutch disks 102 which are supported on a spline 103 of the rotor 100. A rotor 100 forms a hydraulic cylinder 104 which receives the hydraulic pistons 105 forming pressurizing chamber 106. The pressurizing chamber is connected to the conduits 107 and 108 which are in communication with the hydraulic actuating circuit for the clutches and the brake. The rear clutch carrier 19 is rotatably supported on the bearing assemblies 18 and 109.

Figures 4, 5:
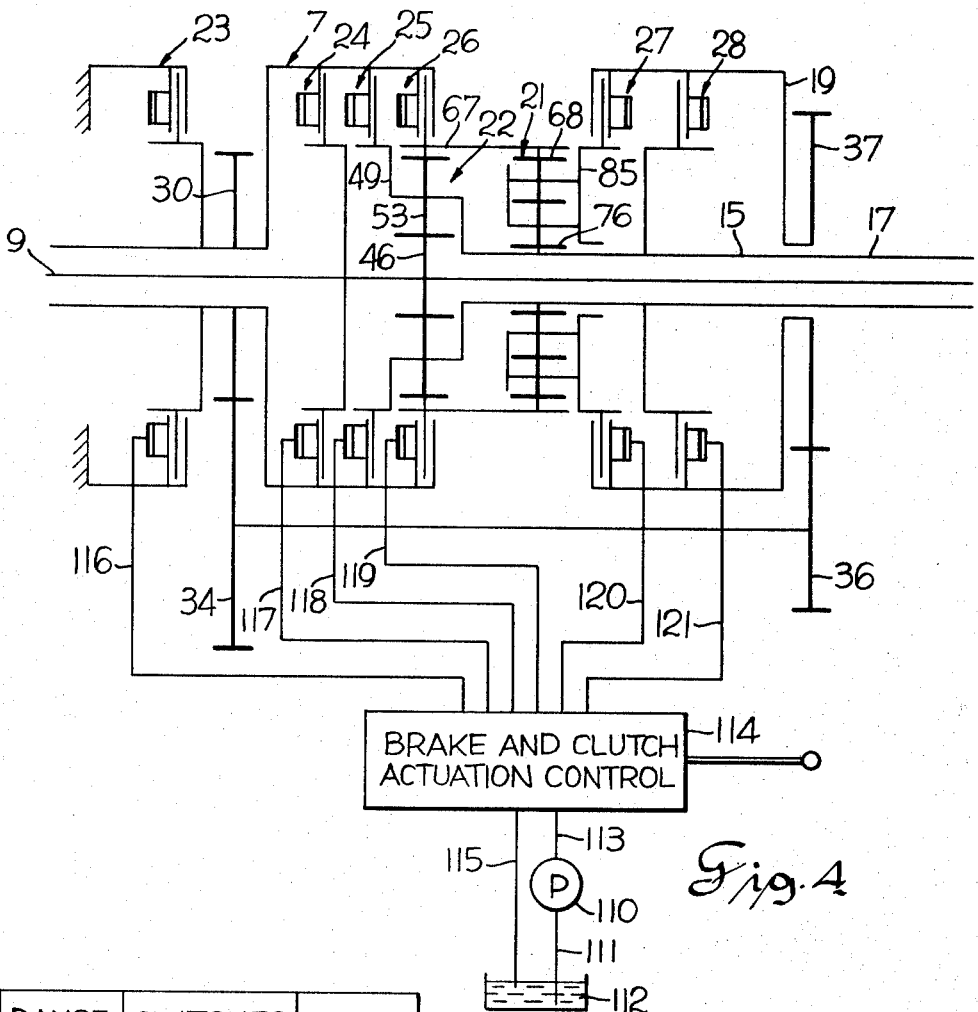
FIG. 4 is a schematic illustration of the hydraulic system and actuating control for the hydraulic transmission.
FIG. 5 is a table of the gear range, clutches actuated, and speed ratio of the transmission.

Referring to FIG. 4, the hydraulic system for actuating the power shift transmission is illustrated. The pump 110 receives hydraulic fluid through conduit 111 from reservoir 112. The pump pressurizes fluid in the conduit 113 which is connected to the brake and clutch actuation control valve 114. Return fluid is returned through the return conduit 115.

The conduit 116 is in communication with the brake 23. The conduits 117, 118, and 119 are in communication with the clutches 24, 25 and 26 respectively on the front clutch carrier. The conduits 120, 121 are in communication with the clutches 27 and 28 on the rear clutch carrier 19 respectively. The brake and clutch actuation control valve 114 selectively actuate one or more of a plurality of brakes and clutches 23, 24, 25, 26, 27 and 28. The operation of the transmission will be described in the following paragraphs.

Power is applied to the input drive shaft 9 and power is taken off the same shaft which is provided with a power take-off spline. Power transmitted through the transmission is taken off the output quill shaft 15.

When the transmission is in reverse, the clutches 26 and 28 are actuated. The power is transmitted from the sun gear 46 through the planet pinion 53 to the ring gear 67 of the front planetary gearset 22 and the ring gear 68 of the second planetary gearset 21, thence through the dual pinion planetary gearset which causes a negative torque and reverse rotation on the output shaft. Simultaneously with the counter-rotation of the ring gear 67, the clutch 26 engages the front clutch carrier 7 causing the counter-rotation of the clutch carrier 7 which is transmitted through the countershaft gearset to the rear clutch carrier 19 and through clutch 28 to produce a reaction torque on the output shaft 15 thereby providing a resultant reverse rotation of the output shaft.

When the transmission is placed in the first forward speed, clutches 26 and the brake 23 are engaged. The positive torque applied to the sun gear 46 produces a negative torque or reaction torque on the ring gear 67. Since the clutch 26 is engaged and the front clutch carrier 7 is locked to the transmission housing by the brake 23, the carrier 49 on the input clutch housing rotates on the inside of the ring gear 67 causing the carrier 49 to drive the sun gear 76 of the rear dual pinion planetary gearset 21. The sun gear 76 is connected to the output shaft 15 and accordingly, it drives the output shaft 15 with a high torque ratio in the forward direction; in other words, the same direction of rotation as the input shaft 9.

When the transmission is shifted to the second forward speed brake 23 is engaged and the clutch 27 is engaged. Braking of the front clutch carrier 7 also locks the countershaft gearset with the rear clutch carrier 19. Clutching of the rear clutch carrier 19 through clutch 27 causes the planetary carrier 85 of the rear planetary gearset 21 to remain stationary while the positive torque applied to the input shaft 9 drives through the front planetary gearset 22. A negative torque is applied to the ring gear 67 which in turn is transmitted to the ring gear 68. With the planetary carrier 85 of the rear planetary gearset 21 locked, the negative reaction torque transmitted through the rear planetary gearset 21 is transmitted as the reaction torque to the sun gear 46. A positive driving torque is transmitted from the sun gear 46 to the carrier 49 which drives the sun gear 76. The result in torque is a positive rotation with a high torque output on the output drive shaft 15.

When the transmission is positioned in the third forward speed, the clutches 26 and 27 are actuated. A positive driving torque from the input shaft 9 is transmitted from the sun gear 46 to the carrier 49 to the output shaft 15. Simultaneously, a reaction torque is generated which is a negative torque transmitted through the clutch 26 through the countershaft gearset 140 and the clutch 27 to the planetary carrier 85 of the second planetary gear set 21, as well as the negative torque being transmitted through the ring gears 67 and 68 to the dual pinion planetary carrier 85 of the rear planetary gearset. The result is a positive torque driving the output shaft 15.

When the transmission is positioned in the fourth forward speed, the clutches 25 and 27 are engaged. A positive torque is applied to the input drive shaft 9 through the sun gear 46 driving the carrier 49 in forward direction. This produces a torque transmitted to the sun gear 76 of the rear planetary gearset 21. Simultaneously a negative reaction torque is transmitted through the ring gear 67 to drive the ring gear 68 of the second planetary gearset 21. A reaction torque is also transmitted from the input planetary carrier 7 through the countershaft gearset 140 to the output clutch carrier 19 which is applied to the planetary carrier 85. The result is a positive torque and forward drive to the output drive shaft 15.

When the transmission is positioned in the fifth forward speed, the clutches 24 and 27 are engaged. The input drive shaft 9 drives the sun gear 46 producing a positive torque which is transmitted through carrier 49 to the sun gear 76 of the rear planetary gearset. Engagement of clutch 24 produces a transmission of positive torque through clutch 24 through front clutch carrier 7 and through the countershaft gearset 140 to the rear clutch carrier 19. With clutch 27 engaged, the positive torque is transmitted through the planetary carrier 85 of the rear planetary gearset 21. Negative reaction torque is also transmitted through the ring gears 67 and 68 with the resultant torque on the sun gear in the positive direction providing forward speed of rotation for the output driven shaft 15.

When the transmission is positioned in the sixth gear range, the clutches 24 and 26 are engaged. With the clutch 24 engaged, the sun gear 46 of the front planetary gearset 22 is locked in the front clutch carrier 7. The ring gear 67 of the front planetary gearset is also locked to the front clutch carrier 7 and the planetary gearset 22 is locked. The forward rotation and positive torque applied to the input drive shaft 9 is transmitted directly through the carrier 49 to the sun gear 76 of the rear planetary gearset 21 providing low torque and high forward speed of rotation on the output driven shaft 15 of the transmission.

It is further noted that the input drive shaft 9 is integral with the power take-off shaft and forms the spline 13 adapted for connection to a power take-off assembly. The output drive shaft 15 is provided with means for transmitting power output from the transmission. The transmission provides for simultaneous power take-off with each gear ratio of the transmission. The transmission, accordingly, will be provided with suitable clutch and braking means with a power take-off assembly for engaging and disengaging of the power take-off assembly. The clutches provide smooth transitions of power, since no more than one transition of a clutch is required to make any shift in the upshifting and downshifting of the gear ratios of the transmission. The relative speeds of the clutch plates are low which reduces roughness in transition of power in the sequence of gearshifts as set forth above.

The embodiments of the invention in which an exclusive property or privilege is claimed are defined as follows:

1. A transmission comprising an input shaft and an output shaft rotatably mounted in a transmission case, a front planetary gearset having a sun gear driven by said input shaft, a rear planetary gearset having a sun gear connected to a planetary carrier of the front planetary gearset and driving said output shaft, means connecting the ring gear of said front planetary gearset with the ring gear of said rear planetary gearset, a front clutch carrier rotatably mounted for coaxial rotation with said input shaft, a rear clutch carrier mounted for coaxial rotation with said output shaft, said front planetary gearset including the elements of a sun gear, a ring gear, and a planetary carrier, a plurality of clutches mounted on said front clutch carrier for clutching said carrier to said elements of said front planetary gearset, said rear planetary gearset defining a dual pinion planetary gearset including dual planetary pinions and having a common direction of rotation of the ring gear and the sun gear, said rear planetary gearset including the elements of a planetary carrier, a ring gear, a sun gear, two clutches mounted on said rear clutch carrier for clutching said rear clutch carrier with two of said elements of said rear planetary gearset, a brake mounted on said transmission case for clutching said front clutch carrier to said transmission case, a drive gear connected to said front clutch carrier, a driven gear connected to said rear clutch carrier, a countershaft gearing for engagement with said drive gear and said driven gear thereby providing a countershaft gearset between said clutch carriers, means for selectively actuating at least one of said brakes and clutches to thereby selectively provide one of a plurality of power paths and gear ratios through said transmission.

2. A transmission as set forth in claim 1 wherein said front clutch carrier carries a clutch having a friction member connected to the ring gear of said front planetary gearset and said rear clutch carrier carries a clutch having a friction member connected to the sun gear of said rear planetary gearset to thereby provide positive torque and forward rotation from the planetary carrier of said front planetary gearset to the output shaft and a negative reaction torque through the ring gear and the countershaft gearset to provide a reverse rotation of the output shaft.

3. A transmission as set forth in claim 1 wherein said brake on said transmission case includes a friction member connected to the front clutch carrier and said front clutch carrier includes a clutch having a friction member connected to the ring gear of the front planetary gearset for braking the front clutch carrier and providing a positive torque through the carrier of the front planetary gearset to the sun gear of the rear planetary gearset to provide a forward speed, high torque output.

4. A transmission as set forth in claim 1 wherein said brake on said transmission case includes a friction member connected to the front clutch carrier and said rear clutch carrier includes a friction member connected to the planetary carrier of the rear planetary gearset to thereby provide a positive driving torque transmitted from the planetary carrier of the first planetary gearset to the sun gear of the rear planetary gearset and a negative reaction torque through the ring gears of said first and second planetary gearsets to thereby provide a positive high torque output on the output drive shaft.

5. A transmission as set forth in claim 1 wherein said front clutch carrier includes a clutch having a friction member connected to the ring gear of the front planetary gearset and the rear clutch carrier includes a friction member connected to the planetary carrier of the rear planetary gearset to thereby provide a positive torque driving from the planetary carrier of the front planetary gearset to the sun gear of the rear planetary gearset and a negative torque transmitted through the ring gears and the countershaft gearing to provide a reaction torque on the ring gear and the planetary carrier of the rear planetary gearset to thereby provide a forward positive torque output on said transmission.

6. A transmission as set forth in claim 1 wherein said front clutch carrier includes a clutch having a friction member connected to the planetary carrier of the front planetary gearset and said rear clutch carrier includes a clutch having a friction member connected to the planetary carrier of the rear planetary gearset to thereby provide a positive torque transmitted from the planetary carrier of the front planetary gearset to the sun gear of the rear planetary gearset to the output shaft and a negative reaction torque transmitted through the ring gears and a negative reaction torque transmitted through the rear planetary carrier of the rear planetary gearset to thereby provide a resultant torque of positive rotation in the output shaft.

7. A transmission as set forth in claim 1 wherein said front clutch carrier includes a clutch having a friction member connected to the sun gear of the front planetary gearset, said rear clutch carrier includes a clutch having a friction member connected to planetary carrier of the rear planetary gearset to thereby provide a positive torque of forward rotation transmitted through the planetary carrier of the front planetary gearset to the sun gear of the rear planetary gearset and the output shaft.

8. A transmission as set forth in claim 1 wherein said front clutch carrier includes a clutch having a friction member connected to the sun gear of the front planetary gearset and a clutch having a friction member connected to the ring gear of said front planetary gearset to thereby lock the front planetary gearset and provide a direct drive through the front planetary gearset to the output drive shaft providing a positive low output torque of forward rotation on the output shaft of the transmission.

9. A transmission as set forth in claim 1 wherein said transmission includes an input drive shaft integral with and including a power take-off shaft including means adapted for connection to the power take-off shaft.

10. A transmission as set forth in claim 1 wherein said output shaft defines a quill shaft rotatably receiving said input shaft to thereby provide coaxial rotation of the input and output shafts.

* * * * *